July 3, 1945.   O. H. SAMUELSON ET AL   2,379,830
PLUNGER CARRIER FOR GLASSWARE FORMING APPARATUS
Filed March 8, 1944   2 Sheets-Sheet 1

INVENTOR.
OTTO H. SAMUELSON
ANTHONY T. ZAPPIA
BY W. P. Hahn
ATTORNEY

July 3, 1945.   O. H. SAMUELSON ET AL   2,379,830
PLUNGER CARRIER FOR GLASSWARE FORMING APPARATUS
Filed March 8, 1944   2 Sheets-Sheet 2
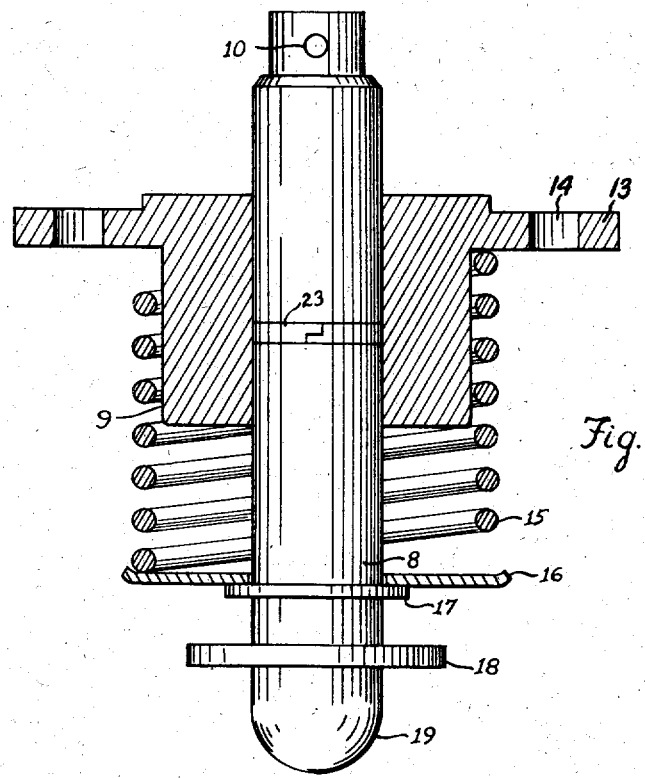
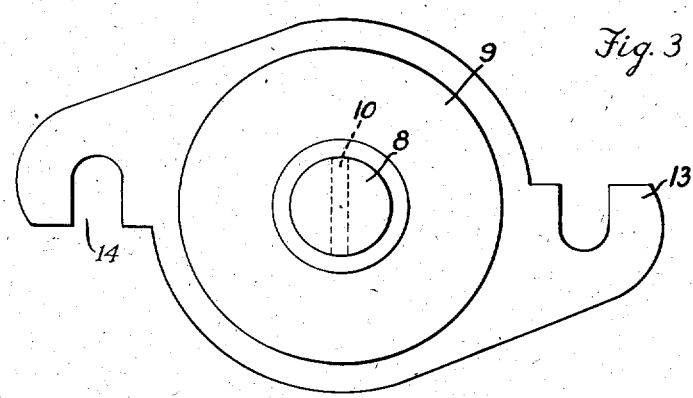
INVENTOR.
OTTO H. SAMUELSON
ANTHONY T. ZAPPIA
BY  W. P. Hahn
ATTORNEY.

Patented July 3, 1945

2,379,830

UNITED STATES PATENT OFFICE 2,379,830

PLUNGER CARRIER FOR GLASSWARE FORMING APPARATUS

Otto H. Samuelson, Muncie, and Anthony T. Zappia, Indianapolis, Ind.

Application March 8, 1944, Serial No. 525,526

4 Claims. (Cl. 49—76)

The present invention relates to improvements in glassware forming apparatus and particularly to glassware forming apparatus for manufacturing hollow glass containers.

In the manufacture of hollow glass containers, the charge of glass is introduced into the blank or parison mold and this charge is compacted in the mold by applying suction around the mouth forming pin. This pin is projected into and retracted from the neck mold by suitable projection apparatus and while the pin is in its projected position, the suction may be applied to the mold and after the pin has been retracted pressure may be applied to elongate the cavity formed in the parison by the mouth forming pin.

One of the difficulties heretofore experienced in this class of apparatus is to provide a suitable mechanism for projecting and retracting the mouth forming pin into the neck forming mold without the loss of the partial vacuum created or without reduction of the pressure.

It is one of the objects of our invention to provide a pin plunger structure which may move the mouth forming pin into and out of position with a minimum dropping of either vacuum or pressure and to provide a pin plunger stem which may be readily substituted for the pin plunger stem now in use on certain types of commercial machines and which will avoid the wear and destruction of the present type of pin plunger stem.

For the purpose of disclosing our invention, we have illustrated an embodiment thereof in the accompanying drawings in which:

Fig. 2 is a longitudinal sectional view of the pin plunger assembly; and

Fig. 3 is a plan view of the structure illustrated in Fig. 1.

Figure 1:
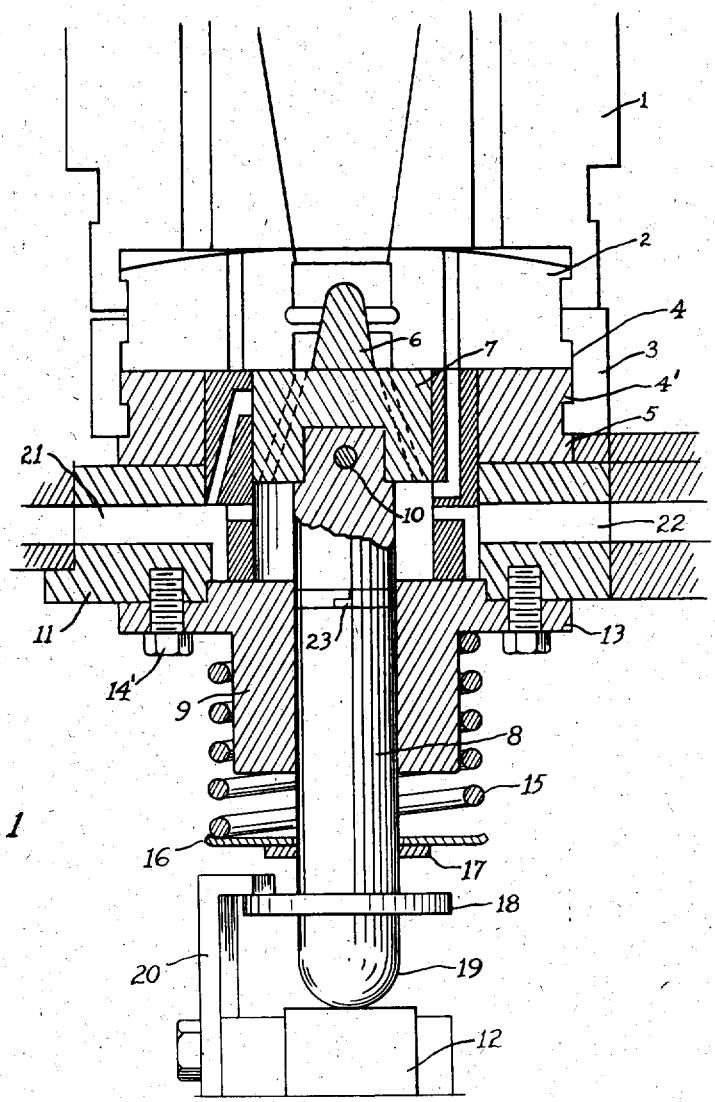
Fig. 1 is a longitudinal section of so much of a parison mold as is necessary for disclosing our invention.

In the illustration, the parison mold I is preferably of the well known sectional type comprising opposed sections pivotally mounted on a hinge pin (not shown). Suitable links or connections (not shown) are provided for opening and closing the mold section I in the usual manner.

Adjacent the neck end of the parison mold are sectional mold sections 2, providing when closed, a neck mold cavity for shaping the neck and mouth end of the article. The neck mold sections are supported in neck mold holders 3 and these holders may be grooved as at 4 to embrace the flanged ends 4' of a sleeve or mouth forming pin plunger box 5 so as to align accurately the neck molds and the mouth forming pin.

The forming pin 6 is mounted on the end of a plunger 7 operating within the plunger box 5 and this plunger is mounted on the end of a plunger stem 8, operating in a guide sleeve 9. The plunger 7 may be provided with a socket in its lower end to receive the upper end of the stem 8 with a pin 10 passing through both to secure the two parts together. This sleeve 9 is secured on the under face of the ring 11 with which the face of the sleeve 5 makes intimate contact when the parison mold is positioned and this plunger stem 8 is raised and lowered by reciprocating cam member 12 adapted to engage the lower end of the stem 8. The guide sleeve 9 is provided with ears 13 having notched openings 14 therein by which the guide sleeve 9 may be securely clamped in position, by means of cap screws 14', to the under side of the ring 11.

The plunger stem 8 is biased in its retracted position through the medium of a spring 15 surrounding the sleeve 9 and engaging a slightly cupped shaped washer 16 held against movement, under the action of the spring, by a ring 17 which may be secured on the stem 8 in a suitable groove in the stem.

Below this ring 17 is provided a retracting rim 18 secured against longitudinal movement on the stem 8 by fitting within a groove in the stem or by other suitable means. The plunger stem 8 is preferably formed of steel. The other parts of the structure including the sleeve, however, are preferably formed of cast iron. That portion of the stem below this rim 18 is provided with a rounded, semi-spherical, hardened end 19 adapted to contact with the cam 12 and adapted to slide over the cam during the rotative movement of the parts which maintains the plunger in position to set the glass in the parison finish. This cam 12 is raised and lowered, by suitable raising and lowering mechanism (not shown), and to insure the stem 8 following the cam in its movement to provide a hook 20, secured to the cam and engaging over the rim 18 and so spaced over the cam so as the stem moves into position, the ring 18 will be moved beneath the hook 20. This hook 20 is provided to insure the retraction of the stem in event the spring 15 fails to act. Being secured on the cam 12 it will, upon lowering the cam, engage the rim 18 and retract the stem as the cam 12 is lowered.

In view of the fact that through a suitable port 22 suction is applied to the neck mold and later at the next station pressure is admitted through the port 21 to the neck mold, it is extremely important that there is no leakage around the stem 8. To this end, we provide a suitable piston ring 23, fitting within a groove in the sleeve 8 and extending within the walls of the sleeve 9.

We claim as our invention:

1. A plunger stem for operating the forming pin plunger of a parison mold of a glassware forming apparatus, comprising a guide sleeve detachably secured to the forming pin plunger box, a plunger pin stem operating within said sleeve having a hardened semi-spherical bottom end, adapted for engagement with the raising and lowering cam for the forming pin, and a piston ring surrounding said stem within said sleeve for forming a substantially air-tight junction between said stem and the walls of said sleeve.

2. A plunger stem for operating the forming pin plunger of a parison mold of a glassware forming apparatus, comprising a guide sleeve having ears, means for detachably securing said sleeve through the medium of said ears to the forming pin plunger box, a plunger pin stem operating within said sleeve having a rounded hardened ball end adapted for engagement with the raising and lowering cam for the forming pin and a piston ring surrounding said stem within said sleeve for forming a substantially air tight junction between said stem and the walls of said sleeve.

3. A plunger stem for operating the forming pin plunger of a parison mold of a glassware forming apparatus, comprising a guide sleeve detachably secured to the forming pin plunger box, a plunger pin stem operating within said sleeve having a hardened ball end for engagement with the raising and lowering cam for the forming pin, a collar surrounding said stem below said sleeve, means for holding said collar against vertical displacement in one direction and a coiled spring surrounding said sleeve and engaging said collar to bias the stem in its retracted position and a piston ring surrounding said stem within said sleeve for forming a substantially air-tight junction between said stem and the walls of said sleeve.

4. A plunger stem for operating the forming pin plunger of a parison mold of a glassware forming apparatus, comprising a guide sleeve having a flange, means for securing said sleeve to the forming pin plunger box through the medium of said flange, a plunger pin operating within said sleeve having a hardened ball end for engagement with the raising and lowering cam for the forming pin, a piston ring surrounding said stem within said sleeve for forming a substantially air-tight junction between said stem and the walls of said sleeve, a collar secured on said stem against vertical displacement in one direction, a coiled spring surrounding said sleeve and interposed between said flange and collar for biasing said stem in its retracted position and a second collar secured to said stem below said first mentioned collar and held against vertical displacement on said stem and adapted for engagement for a retracting member on a raising and lowering cam.

OTTO H. SAMUELSON.
ANTHONY T. ZAPPIA.

CERTIFICATE OF CORRECTION.

Patent No. 2,379,830.  July 3, 1945.

OTTO H. SAMUELSON, ET AL.

It is hereby certified that error appears in the printed specification of the above numbered patent requiring correction as follows: Page 1, second column, line 44, for "to" before "provide" read --we--; and that the said Letters Patent should be read with this correction therein that the same may conform to the record of the case in the Patent Office.

Signed and sealed this 11th day of September, A. D. 1945.

Leslie Frazer (Seal)  First Assistant Commissioner of Patents.

the port 21 to the neck mold, it is extremely important that there is no leakage around the stem 8. To this end, we provide a suitable piston ring 23, fitting within a groove in the sleeve 8 and extending within the walls of the sleeve 9.

We claim as our invention:

1. A plunger stem for operating the forming pin plunger of a parison mold of a glassware forming apparatus, comprising a guide sleeve detachably secured to the forming pin plunger box, a plunger pin stem operating within said sleeve having a hardened semi-spherical bottom end, adapted for engagement with the raising and lowering cam for the forming pin, and a piston ring surrounding said stem within said sleeve for forming a substantially air-tight junction between said stem and the walls of said sleeve.

2. A plunger stem for operating the forming pin plunger of a parison mold of a glassware forming apparatus, comprising a guide sleeve having ears, means for detachably securing said sleeve through the medium of said ears to the forming pin plunger box, a plunger pin stem operating within said sleeve having a rounded hardened ball end adapted for engagement with the raising and lowering cam for the forming pin and a piston ring surrounding said stem within said sleeve for forming a substantially air tight junction between said stem and the walls of said sleeve.

3. A plunger stem for operating the forming pin plunger of a parison mold of a glassware forming apparatus, comprising a guide sleeve detachably secured to the forming pin plunger box, a plunger pin stem operating within said sleeve having a hardened ball end for engagement with the raising and lowering cam for the forming pin, a collar surrounding said stem below said sleeve, means for holding said collar against vertical displacement in one direction and a coiled spring surrounding said sleeve and engaging said collar to bias the stem in its retracted position and a piston ring surrounding said stem within said sleeve for forming a substantially air-tight junction between said stem and the walls of said sleeve.

4. A plunger stem for operating the forming pin plunger of a parison mold of a glassware forming apparatus, comprising a guide sleeve having a flange, means for securing said sleeve to the forming pin plunger box through the medium of said flange, a plunger pin operating within said sleeve having a hardened ball end for engagement with the raising and lowering cam for the forming pin, a piston ring surrounding said stem within said sleeve for forming a substantially air-tight junction between said stem and the walls of said sleeve, a collar secured on said stem against vertical displacement in one direction, a coiled spring surrounding said sleeve and interposed between said flange and collar for biasing said stem in its retracted position and a second collar secured to said stem below said first mentioned collar and held against vertical displacement on said stem and adapted for engagement for a retracting member on a raising and lowering cam.

OTTO H. SAMUELSON.
ANTHONY T. ZAPPIA.

CERTIFICATE OF CORRECTION.

Patent No. 2,379,830.            July 3, 1945.

OTTO H. SAMUELSON, ET AL.

It is hereby certified that error appears in the printed specification of the above numbered patent requiring correction as follows: Page 1, second column, line 44, for "to" before "provide" read --we--; and that the said Letters Patent should be read with this correction therein that the same may conform to the record of the case in the Patent Office.

Signed and sealed this 11th day of September, A. D. 1945.

Leslie Frazer (Seal)                         First Assistant Commissioner of Patents.